US012695100B2

(12) United States Patent
Nomura et al.

(10) Patent No.: US 12,695,100 B2
(45) Date of Patent: Jul. 28, 2026

(54) CATALYST FOR FUEL CELL

(71) Applicants: TOYOTA JIDOSHA KABUSHIKI KAISHA, Toyota (JP); CATALER CORPORATION, Kakegawa (JP)

(72) Inventors: Kumiko Nomura, Okazaki (JP); Rui Imoto, Fujisawa (JP); Hidetoshi Okada, Kani-gun (JP); Naoki Hasegawa, Nagakute (JP); Tomohiro Takeshita, Nagakute (JP); Kazuhisa Yano, Nagakute (JP); Kenji Yamamoto, Hamamatsu (JP); Yuko Matsumura, Iwata (JP); Yuuki Kasama, Yokkaichi (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 564 days.

(21) Appl. No.: 18/334,471

(22) Filed: Jun. 14, 2023

(65) Prior Publication Data

US 2024/0006619 A1 Jan. 4, 2024

(30) Foreign Application Priority Data

Jul. 1, 2022 (JP) ................................. 2022-107189

(51) Int. Cl.
*H01M 4/92* (2006.01)

(52) U.S. Cl.
CPC ................................... *H01M 4/926* (2013.01)

(58) Field of Classification Search
CPC ...................................................... H01M 4/926
See application file for complete search history.

(56) References Cited

U.S. PATENT DOCUMENTS

2014/0295316 A1* 10/2014 Ball .................... H01M 4/9083
429/525
2022/0263100 A1* 8/2022 Sato ......................... B01J 35/64

FOREIGN PATENT DOCUMENTS

| JP | 2003036856 A | 2/2003 |
|----|--------------|--------|
| JP | 2006152249 A | 6/2006 |
| JP | 4315857 B2 | 8/2009 |
| JP | 2013216811 A | 10/2013 |
| JP | 2017199656 A | 11/2017 |
| JP | 2020024796 A | 2/2020 |
| JP | 2020166941 A | 10/2020 |
| WO | 2012/088166 A1 | 6/2012 |

* cited by examiner

*Primary Examiner* — Brian R Ohara
(74) *Attorney, Agent, or Firm* — Dickinson Wright, PLLC

(57) ABSTRACT

The present embodiment is a catalyst for a fuel cell including: a catalyst metal; and a carrier that supports the catalyst metal, in which an outer surface area of the carrier to an inner surface area of the carrier, which is a ratio between the inner and outer surface areas of the carrier, is 0.56 to 0.69, and a proportion of the catalyst metal supported on an outer surface of the carrier is 23% to 35%.

5 Claims, 1 Drawing Sheet

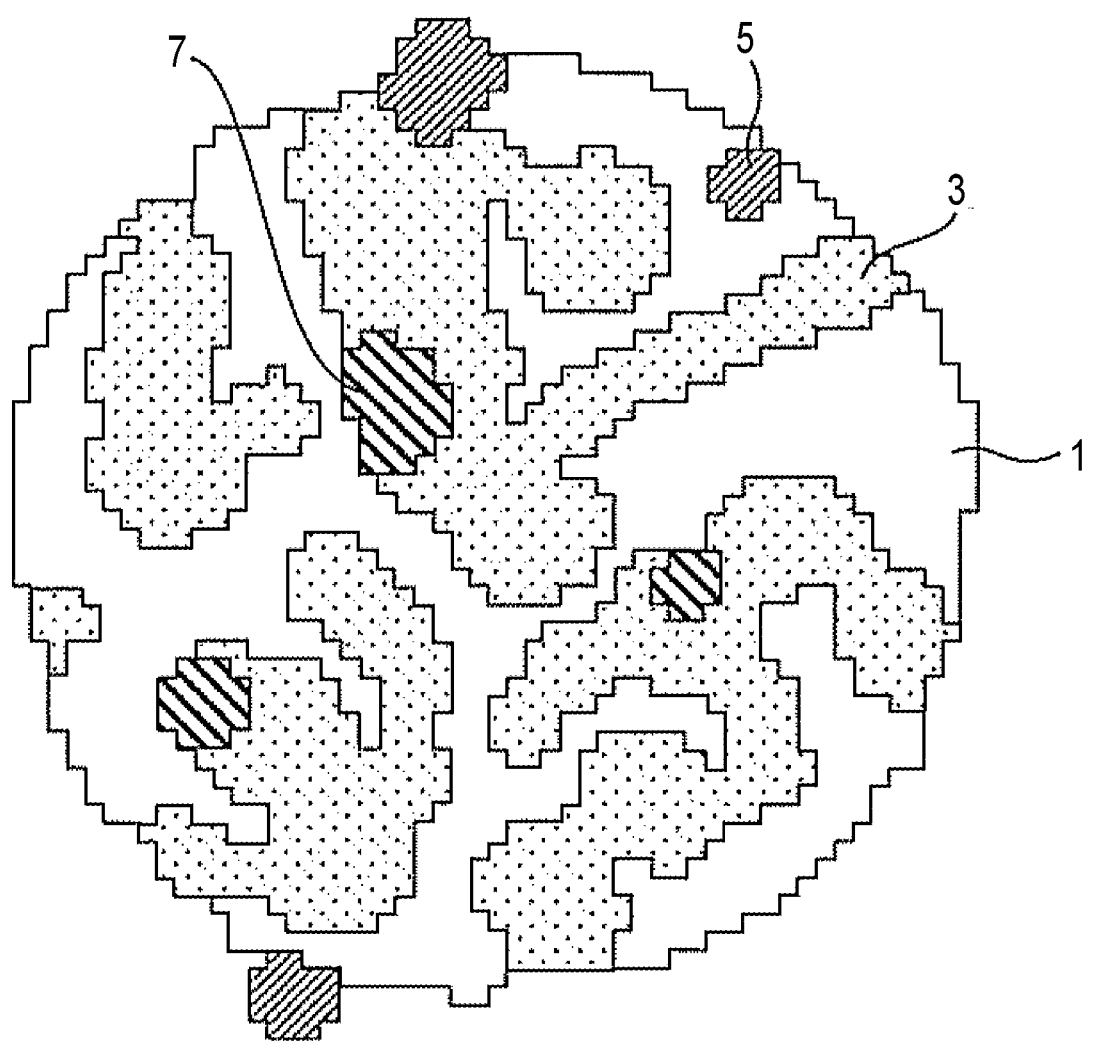

CATALYST FOR FUEL CELL

CROSS-REFERENCE TO RELATED APPLICATION

This application claims priority to Japanese Patent Application No. 2022-107189 filed on Jul. 1, 2022, incorporated herein by reference in its entirety.

BACKGROUND

1. Technical Field

The present disclosure relates to a catalyst for a fuel cell.

2. Description of Related Art

In a fuel cell, a fuel gas (hydrogen gas) and an oxidant gas (oxygen gas) are supplied to two electrodes electrically connected to each other to electrochemically oxidize a fuel, whereby chemical energy is directly converted into electrical energy. This fuel cell is generally configured by stacking a plurality of unit cells each having, as a basic structure, a membrane electrode assembly in which an electrolyte membrane is sandwiched between a pair of electrodes (catalyst layers). Particularly, a solid polymer electrolyte fuel cell using a solid polymer electrolyte membrane as an electrolyte membrane has advantages such as ease of miniaturization and operability at low temperatures and thus has attracted attention as a power source for portable use or for a moving body.

In the solid polymer electrolyte fuel cell, a reaction of Expression (1) proceeds at an anode (fuel electrode) to which hydrogen is supplied.

$$H_2 \rightarrow 2H^+ + 2e^- \qquad (1)$$

Electrons ($e^-$) generated in Expression (1) move through an external circuit, work under an external load, and thereafter arrive at a cathode (air electrode/oxidant electrode). On the other hand, protons (H+) generated in Expression (1) move in the solid polymer electrolyte membrane from the anode side to the cathode side by electroosmosis in a state of being hydrated with water.

On the other hand, a reaction of Expression (2) proceeds at the cathode.

$$2H^+ + \tfrac{1}{2}O_2 + 2e^- \rightarrow H_2O \qquad (2)$$

Accordingly, a chemical reaction represented by Expression (3) proceeds in the entire battery, generating an electromotive force and performing electrical work on the external load.

$$H_2 + \tfrac{1}{2}O_2 \rightarrow H_2O \qquad (3)$$

A catalyst layer usually contains a catalyst having catalyst metal such as platinum or a platinum alloy supported on a carrier having fine pores such as carbon for promoting the electrode reaction, and an ionomer for securing proton conductivity.

In the field of fuel cells having such a configuration, attempts have been made to improve the performance of a fuel cell by focusing on catalyst layers. For example, in Japanese Unexamined Patent Application Publication No. 2020-24796(JP 2020-24796 A) discloses a method for producing a catalyst for a fuel cell including: thermally treating a carrier made of mesoporous carbon at 2,300° C. or higher and 2,500° C. or lower; causing the thermally treated carrier to support a catalyst metal, and immersing the carrier having the catalyst metal supported thereon in an acid solution having a temperature of 80° C. or higher and 95° C. or lower and a concentration of 0.5 mol/L or more for an oxidation treatment.

SUMMARY

In order to further improve the power generation performance of a fuel cell, the present inventors conducted examinations on whether or not the performance of a catalyst for a fuel cell can be improved from a different viewpoint from the related art.

The present disclosure provides a catalyst for a fuel cell with improved performance compared to a catalyst for a fuel cell in the related art.

By setting a ratio between inner and outer surface areas of a carrier included in a catalyst for a fuel cell and a proportion of a catalyst metal supported on an outer surface of the carrier to specific ranges, a catalyst for a fuel cell having improved performance compared to a catalyst for a fuel cell in the related art is obtained.

Examples of aspects of the present embodiment are described as follows.

A first aspect of the present disclosure is a catalyst for a fuel cell, including: a catalyst metal; and a carrier that supports the catalyst metal, in which:

an outer surface area of the carrier to an inner surface area of the carrier, which is a ratio between the inner and outer surface areas of the carrier, is 0.56 to 0.69; and a proportion of the catalyst metal supported on an outer surface of the carrier is 230% to 35%.

In the first aspect of the present disclosure, the carrier may be mesoporous carbon. In the first aspect of the present disclosure, the catalyst metal may be platinum or a platinum alloy.

According to the present disclosure, a catalyst for a fuel cell with improved performance compared to a catalyst for a fuel cell in the related art can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is an image diagram showing a state in which a catalyst metal is supported on a carrier in a catalyst for a fuel cell.

DETAILED DESCRIPTION OF EMBODIMENTS

The present embodiment is a catalyst for a fuel cell including: a catalyst metal; and a carrier that supports the catalyst metal, in which an outer surface area of the carrier to an inner surface area of the carrier, which is a ratio between the inner and outer surface areas of the carrier, is 0.56 to 0.69, and a proportion of the catalyst metal supported on an outer surface of the carrier is 23% to 35%. The catalyst for a fuel cell of the present embodiment is suitably used as a catalyst for a cathode (air electrode) of a fuel cell. Hereinafter, the present embodiment will be described in detail.

Catalyst Metal

The catalyst for a fuel cell of the present embodiment contains the catalyst metal. The catalyst metal is not particularly limited, and noble metal elements such as platinum, ruthenium, palladium, iridium, rhodium, and alloys thereof can be used, and platinum or platinum alloys are preferably used. As the platinum alloy, there are alloys containing platinum and at least one metal selected from cobalt, nickel, iron, manganese, copper, titanium, tungsten, tin, gallium, zirconium, chromium, gadolinium, terbium, ytterbium, hafnium, and osmium. As the platinum alloy, a platinum-cobalt alloy and a platinum-nickel alloy are preferable. An average particle diameter of the catalyst metal is not particularly limited, and is preferably 2 nm or more, and more preferably 2.5 nm or more. In addition, the average particle diameter of the catalyst metal is preferably 10 nm or less, and more preferably 5 nm or less.

In a case where the catalyst metal is platinum or a platinum alloy, the catalyst for a fuel cell has a density of supported platinum of usually 1 wt % to 99 wt %, preferably 10 wt % to 90 wt %, and more preferably 30 wt % to 70 wt %, from the viewpoint of excellent catalytic performance. The supported platinum density can be calculated by weight of platinum/(weight of the catalyst for a fuel cell)×100 (wt %).

Carrier

The catalyst for a fuel cell of the present embodiment includes the carrier that supports the catalyst metal. The carrier is not particularly limited, and usually carbon materials, preferably mesoporous carbon, can be used.

The outer surface area of the carrier to the inner surface area of the carrier, which is the ratio between the inner and outer surface areas of the carrier, is 0.56 to 0.69. The outer surface area of the carrier is an area of the outer surface of the carrier, and the inner surface area of the carrier is an area of an inner surface of the carrier. In the present embodiment, a surface of the carrier is a concept including not only a surface in contact with the outside of the carrier but also surfaces of internal structure (walls, pores) of particles such as pores of the carrier. In the present embodiment, the outer surface of the carrier means the surface in contact with the outside of the carrier, and the inner surface of the carrier means the surfaces of the internal structures of the particles. The inner surface (inner surface area) and outer surface (outer surface area) of the carrier can be obtained by analyzing the catalyst with 3D-TEM. Specifically, the inner surface (inner surface area) and outer surface (outer surface area) of the carrier can be obtained by a method described in examples.

The outer surface area of the carrier is preferably 0.03 $\mu m^2$/particle to 0.2 $\mu m^2$/particle. In addition, the inner surface area of the carrier is preferably 0.05 $\mu m^2$/particle to 0.35 $\mu m^2$/particle. Furthermore, the surface area (outer surface area+inner surface area) of the carrier is preferably 0.08 $\mu m^2$/particle to 0.5 $\mu m^2$/particle.

The carrier supports the catalyst metal described above, and the catalyst metal is supported on the inner and outer surfaces of the carrier. The catalyst for a fuel cell will be described with reference to an image diagram (FIG. 1) showing a state in which the catalyst metal is supported on the carrier in the catalyst for a fuel cell.

The carrier includes an outer surface 1 and an inner surface 3, which is the surface of the internal structure such as a pore, and in the catalyst for a fuel cell of the present embodiment, the catalyst metal is supported on the outer surface 1 and the inner surface 3. The catalyst metal supported on the outer surface 1 is also referred to as an external particle 5, and the catalyst metal supported on the inner surface 3 is also referred to as an inner particle 7.

In the catalyst for a fuel cell of the present embodiment, the proportion of the catalyst metal supported on the outer surface of the carrier is 23% to 35%. A three-dimensional structure of the catalyst for a fuel cell is analyzed by 3D-TEM, for example, by a method described in the examples, the number of external particles and the number of internal particles are counted, and the proportion can be calculated from the numbers by the following expressions.

Proportion (%) of the catalyst metal supported on the outer surface of the carrier=number of external particles/(number of external particles+ number of internal particles)×100.

In a case where the carrier is mesoporous carbon, the mesoporous carbon is preferably carbon particles having a pore volume of 80% or more in a pore diameter distribution of 2 nm to 10 nm with respect to the total pore volume in a pore diameter distribution of 1 nm to 100 nm and having mesopores therein.

An average primary particle diameter (average equivalent circle diameter) of the mesoporous carbon is not particularly limited, and is preferably 30 nm or more and 300 nm or less. The average primary particle diameter of the mesoporous carbon is preferably 270 nm or less, and more preferably 250 nm or less. The average primary particle diameter of the mesoporous carbon is preferably 50 nm or more, and more preferably 70 nm or more.

A pore diameter and a primary particle diameter of the mesoporous carbon are values measured by methods generally used in the field. For example, the pore diameter can be obtained by an analysis of adsorption data of nitrogen adsorption isotherms with a BJH method and a calculation at values of P/PO=0.03 to 0.99. In addition, the primary particle diameter can be obtained by, for example, calculating a diameter (area equivalent circle diameter) of a certain particle when the particle is regarded as a circle in a transmission electron microscope (TEM) image or a scanning electron microscope (SEM) image at an appropriate magnification (for example, 50,000 times to 1,000,000 times), performing the particle diameter calculation by such TEM observation or SEM observation on 100 particles of the same type, and using the number average of these particles as an average primary particle diameter.

Method for Producing Carrier

A method for producing the carrier will be described below, taking as an example the case where the carrier is mesoporous carbon.

The mesoporous carbon is produced using mesoporous silica as a template.

Method for Producing Mesoporous Silica (Template)

As a method for producing the mesoporous silica used as the template for producing the mesoporous carbon, the following method may be used. The method for producing the mesoporous silica (template) preferably includes a polymerizing step (1-1 step) of allowing a silica source to undergo condensation polymerization in a reaction solution containing the silica source, a surfactant, and a catalyst to obtain precursor particles, a drying step (1-2 step) of separating the precursor particles from the reaction solution and drying the precursor particles, and a baking step (1-3 step) of baking the precursor particles to obtain mesoporous silica.

The method for producing the mesoporous silica may further include a diameter expansion step of performing a diameter expansion treatment on the dried precursor particles.

1-1 Step: Polymerizing Step

First, in a reaction solution containing a silica source, a surfactant, and a catalyst, the silica source is allowed to undergo condensation polymerization to obtain precursor particles (polymerizing step). The polymerizing step is usually performed in a solvent.

Silica Source

In the present disclosure, the type of the silica source is not particularly limited. Examples of the silica source include (a) tetraalkoxysilanes, such as tetramethoxysilane, tetraethoxysilane, tetraisopropoxysilane, tetrabutoxysilane, dimethoxydiethoxysilane, and tetraethyleneglycoxysilane, (b) trialkoxysilanes, such as 3-mercaptopropyltrimethoxysilane, 3-aminopropyltrimethoxysilane, 3-aminopropyltriethoxysilane, and 3-(2-aminoethyl) aminopropyltrimethoxysilane, and (c) silicates such as sodium silicate and kanemite ($NaHSi_2O_5 \cdot 3H_2O$).

As the silica source, any one thereof may be used or two or more thereof may be used in combination.

Surfactant

In the case where the silica source is allowed to undergo the condensation polymerization in the reaction solution, when a surfactant is added to the reaction solution, the surfactant forms micelles in the reaction solution. Since hydrophilic groups gather around the micelles, the silica source is adsorbed to surfaces of the micelles. Furthermore, the micelles to which the silica source is adsorbed self-organize in the reaction solution, and the silica source undergoes condensation polymerization. As a result, inside primary particles, mesopores (including micropores having a diameter of 2 nm or less, which will be also true below) attributed to the micelles are formed. Sizes of the mesopores can be controlled (to be 1 nm to 50 nm) mainly by a molecular length of the surfactant.

In the present disclosure, the type of the surfactant is not particularly limited, and an alkyl quaternary ammonium salt is preferably used as the surfactant. As the alkyl quaternary ammonium salt, a compound represented by Formula (a) is preferable.

$$CH_3-(CH_2)_n-N^+(R^1)(R^2)(R^3)X^- \tag{a}$$

In Formula (a), $R^1$, $R^2$, and $R^3$ each represent an alkyl group having 1 to 3 carbon atoms. $R^1$, $R^2$, and $R^3$ may be the same or may be different from each other. In order to facilitate the aggregation of the alkyl quaternary ammonium salts (formation of the micelles), $R^1$, $R^2$, and $R^3$ are preferably all the same. Furthermore, at least one of $R^1$, $R^2$, and $R^3$ is preferably a methyl group, and all of them are preferably methyl groups. In Formula (a), X represents a halogen atom. The type of halogen atom is not particularly limited, and X is preferably Cl or Br from the viewpoint of easy procurement.

In Formula (a), n represents an integer of 7 to 21. In general, as n becomes smaller, spherical mesoporous bodies including mesopores with a smaller median pore diameter are obtained. On the other hand, as n becomes larger, the median pore diameter becomes larger; however, when n becomes too large, a hydrophobic interaction of the alkyl quaternary ammonium salt becomes excessive. As a result, a layered compound is generated, and spherical mesoporous bodies cannot be obtained. n is preferably 9 to 17 and more preferably 13 to 17.

Among the compounds represented by Formula (a), alkyltrimethylammonium halide is preferable. Examples of the alkyltrimethylammonium halide include hexadecyltrimethylammonium halide, octadecyltrimethylammonium halide, nonyltrimethylammonium halide, decyltrimethylammonium halide, undecyltrimethylammonium halide, dodecyltrimethylammonium halide, tridecyltrimethylammonium halide, tetradecyltrimethylammonium halide, and pentadecyltrimethylammonium halide.

Particularly, alkyltrimethylammonium bromide or alkyltrimethylammonium chloride is preferable.

As the surfactant used in producing the mesoporous silica, one type of alkyl quaternary ammonium salt may be used, or two or more types may be used. However, since the alkyl quaternary ammonium salt serves as a template for forming mesopores in the primary particles, the type of the alkyl quaternary ammonium salt has a significant influence on shapes of the mesopores. In order to synthesize silica particles (mesoporous silica) having more uniform mesopores, one type of alkyl quaternary ammonium salt is preferably used.

Catalyst

In the case where the silica source is allowed to undergo the condensation polymerization, a catalyst is usually added to the reaction solution. In a case where particulate mesoporous silica is synthesized, as the catalyst, an alkali, such as sodium hydroxide or aqueous ammonia, may be used or an acid, such as hydrochloric acid, may be used.

Solvent

As a solvent, it is preferable to use water, an organic solvent such as alcohol, a mixed solvent of water and an organic solvent, or the like.

The alcohol may be any of (1) a monovalent alcohol, such as methanol, ethanol, or propanol, (2) a divalent alcohol, such as ethylene glycol, and (3) a trivalent alcohol, such as glycerin.

When the mixed solvent of water and an organic solvent is used, the amount of the organic solvent in the mixed solvent can be arbitrarily selected depending on the intended purpose. In general, when an appropriate amount of an organic solvent is added to the solvent, the control of particle diameter or the particle size distribution becomes easy. Furthermore, in the case where the mixed solvent of water and an organic solvent is used, when a mixed solvent in which the amount of the organic solvent is 5 mass % or less (that is, a mixed solvent in which the amount of water is 95 mass % or more) is used, it is possible to produce, at low costs, mesoporous silica for producing mesoporous carbon having excellent flooding resistance.

Composition of Reaction Solution

A composition of the reaction solution affects an outer shape and pore structure of mesoporous silica to be synthesized. In particular, a concentration of the surfactant and a concentration of the silica source in the reaction solution have a significant influence on the average diameter, pore diameter, pore volume, and linearity of the primary particles of the mesoporous silica particles.

Concentration of Surfactant

When the concentration of the surfactant is too low, a precipitation rate of the particles becomes slow, and a structure in which the primary particles are connected cannot be obtained. Therefore, the concentration of the surfactant is usually 0.03 mol/L or more. The concentration of the surfactant is preferably 0.035 mol/L or more, and more preferably 0.04 mol/L or more.

On the other hand, when the concentration of the surfactant is too high, the precipitation rate of the particles becomes too fast, and primary particle diameters easily exceed 300 nm. Therefore, the concentration of the surfactant usually needs to be 1.0 mol/L or less. The concentration of the surfactant is preferably 0.95 mol/L or less and more preferably 0.90 mol/L or less.

Concentration of Silica Source

When the concentration of the silica source is too low, the precipitation rate of the particles becomes slow, and a structure in which the primary particles are connected cannot be obtained. Alternatively, the surfactant becomes excessive and uniform mesopores may not be obtained. Therefore, the concentration of the silica source is usually 0.05 mol/L or more. The concentration of the silica source is preferably 0.06 mol/L or more, and more preferably 0.07 mol/L or more.

On the other hand, when the concentration of the silica source is too high, the precipitation rate of the particles becomes too fast, and the primary particle diameters easily exceed 300 nm. Alternatively, sheet-like particles may be obtained instead of spherical particles. Therefore, the concentration of the silica source usually needs to be 1.0 mol/L or less. The concentration of the silica source is preferably 0.95 mol/L or less and more preferably 0.90 mol/L or less.

Concentration of Catalyst

The concentration of the catalyst when producing mesoporous silica is not particularly limited. In general, when the concentration of the catalyst is too low, the precipitation rate of the particles becomes slow. On the other hand, when the concentration of the catalyst is too high, the precipitation rate of the particles becomes fast. As an optimum concentration of the catalyst, an optimum concentration is preferably selected depending on the type of the silica source, the type of the surfactant, intended physical property values, and the like.

For example, in a case where an acid is used as the catalyst, the concentration of the catalyst is preferably adjusted such that a pH of the reaction solution becomes 9 or less. The pH of the reaction solution is preferably 8.5 or less and more preferably less than 5. On the other hand, in a case where an alkali is used as the catalyst, the concentration of the catalyst is preferably adjusted such that the pH of the reaction solution exceeds 7.

Reaction Conditions

The silica source is added to the solvent containing a predetermined amount of the surfactant to undergo hydrolysis and condensation polymerization. Accordingly, the surfactant functions as a template, and precursor particles containing silica and the surfactant are obtained. As reaction conditions, optimum conditions are selected depending on the type of the silica source, the particle diameters of the precursor particles, and the like. In general, a reaction temperature is preferably −20° C. to 100° C. The reaction temperature is more preferably 0° C. to 100° C., even more preferably 0° C. to 90° C., particularly preferably 10° C. to 80° C., and most preferably 35° C. to 80° C.

1-2 Step: Drying Step

Next, the precursor particles are separated from the reaction solution and dried (drying step).

The drying is performed to remove the solvent remaining in the precursor particles. Drying conditions are not particularly limited as long as the solvent can be removed.

Diameter Expansion Step

Next, a diameter expansion treatment may be performed on the dried precursor particles as needed (diameter expansion step). The "diameter expansion treatment" refers to a treatment for expanding the diameters of the mesopores in the primary particles. Specifically, the diameter expansion treatment is performed by hydrothermally treating the synthesized precursor particles (the precursor particles from which the surfactant is not removed) in a solution containing a diameter-expanding agent. This treatment makes it possible to expand the pore diameters of the precursor particles.

Examples of the diameter-expanding agent include (a) hydrocarbons, such as trimethylbenzene, triethylbenzene, benzene, cyclohexane, triisopropylbenzene, naphthalene, hexane, heptane, octane, nonane, decane, undecane, and dodecane, and (b) acids, such as hydrochloric acid, sulfuric acid, and nitric acid.

It is considered that the hydrothermal treatment under coexistence with a hydrocarbon expands the pore diameters since silica is rearranged when the diameter-expanding agent is introduced from the solvent into pores of the more hydrophobic precursor particles.

In addition, it is considered that the hydrothermal treatment under coexistence with an acid, such as hydrochloric acid, expands the pore diameters since dissolution and reprecipitation of silica proceed inside the primary particles. When production conditions are optimized, radial pores are formed inside the silica. When these pores are hydrothermally treated under coexistence with an acid, dissolution and reprecipitation of silica occur, and the radial pores are converted into communicating pores.

The conditions for the diameter expansion treatment are not particularly limited as long as intended pore diameters can be obtained. Usually, it is preferable to add approximately 0.05 mol/L to 10 mol/L of the diameter-expanding agent to the reaction solution and perform the hydrothermal treatment at 60° C. to 150° C.

1-3 Step: Baking Step

Next, after the diameter expansion treatment is performed as needed, the precursor particles are baked (baking step). Therefore, mesoporous silica is obtained. The baking is performed to dehydrate and polymerize the precursor particles in which an OH group remains and to thermally decompose the surfactant remaining in the mesopores. Baking conditions are not particularly limited as long as dehydration and polymerization, and the thermal decomposition of the surfactant are possible. The baking is usually performed by heating the precursor particles in air at 400° C. to 700° C. for 1 hour to 10 hours.

Method for Producing Mesoporous Carbon

A method for producing mesoporous carbon includes a first step of preparing mesoporous silica that serves as a template, a second step of allowing carbon to precipitate in mesopores of the mesoporous silica to produce a mesoporous silica/carbon complex, and a third step of removing the mesoporous silica from the complex. The method for producing mesoporous carbon may further include a fourth step of thermally treating the mesoporous carbon at a temperature higher than 1,500° C., after the third step.

First Step (Production of Template (Mesoporous Silica))

First, mesoporous silica that serves as a template is produced (first step). Details of a method for producing the mesoporous silica are as described above as [Method for Producing Mesoporous Silica (Template)], so that description thereof will be omitted.

Second Step (Precipitation of Carbon in Mesopores)

Next, carbon is precipitated in the mesopores in the mesoporous silica to produce a mesoporous silica/carbon complex (second step).

Precipitation of carbon into the mesopores is specifically performed by (a) introducing a carbon precursor into the mesopores and (b) polymerizing and carbonizing the carbon precursor in the mesopores.

(a) Introduction of Carbon Precursor

The "carbon precursor" refers to a substance capable of generating carbon by thermal decomposition. Specifically, as the carbon precursor, there are (1) a polymer precursor that is liquid at room temperature and is thermally polymerizable (for example, furfuryl alcohol or aniline), (2) a mixture of an aqueous solution of a carbohydrate and an acid (for example, a mixture of a monosaccharide, such as sucrose, xylose (wood sugar), or glucose (dextrose), a disaccharide, or a polysaccharide, and an acid, such as sulfuric acid, hydrochloric acid, nitric acid, or phosphoric acid), (3) a mixture of two-component curable polymer precursors (for example, phenol or formalin), and the like.

Particularly, the polymer precursor can be infused into the mesopores without being diluted with a solvent and is thus capable of generating a relatively large amount of carbon in the mesopores with a relatively small number of times of infusion. In addition, the polymer precursor has an advantage in that no polymerization initiator is needed and handling is also easy.

In a case where a liquid or solution-form carbon precursor is used, the amount of the liquid or solution adsorbed per time is preferably as large as possible and is preferably an amount large enough to fill all of the mesopores with the liquid or solution. In addition, in a case where the mixture of an aqueous solution of a carbohydrate and an acid is used as the carbon precursor, the amount of the acid is preferably set to a minimum amount enough to polymerize organic substances. Furthermore, in a case where a mixture of two-component curable polymer precursors is used as the carbon precursor, as a ratio therebetween, an optimum ratio is selected depending on the type of the polymer precursor.

(b) Polymerization and Carbonization of Carbon Precursor

The carbon precursor introduced into the mesopores can be polymerized by a known method such as heating according to the type of carbon precursor, and then the polymerized carbon precursor is carbonized in the mesopores.

The carbonization of the carbon precursor is performed by heating the mesoporous silica containing the carbon precursor to a predetermined temperature in a non-oxidizing atmosphere (for example, in an inert atmosphere, or in a vacuum). Specifically, the heating temperature is preferably 500° C. or higher and 1,200° C. or lower. When the heating temperature is lower than 500° C., the carbon precursor is not sufficiently carbonized. On the other hand, when the heating temperature exceeds 1,200° C., silica and carbon react with each other, which is not preferable. As a heating time, an optimum heating time is selected depending on the heating temperature.

The amount of carbon generated in the mesopores needs to be equal to or larger than an amount large enough for carbon particles to maintain their shapes when the mesoporous silica has been removed. Therefore, in a case where the amount of carbon generated by one round of filling, polymerization, and carbonization is relatively small, these steps are preferably repeated a plurality of times. In this case, conditions for each of the steps to be repeated may be the same or may be different from each other.

In addition, in a case where each step of filling, polymerization, and carbonization is repeated a plurality of times, in each carbonization step, a carbonization treatment may be performed at a relatively low temperature, and, after the end of the final carbonization treatment, a carbonization treatment may be performed again at a higher temperature than that of the previous temperature. When the final carbonization treatment is performed at a higher temperature than that of the previous carbonization treatment, it becomes easy to integrate carbon introduced into the pores a plurality of times.

Third Step (Removal of Mesoporous Silica)

Next, the mesoporous silica, which is a template, is removed from the complex (third step). As a result, mesoporous carbon is obtained.

Specifically, as a method for removing the mesoporous silica, there are (1) a method of heating the complex in an alkaline aqueous solution, such as sodium hydroxide, (2) a method of etching the complex with a hydrofluoric acid aqueous solution, and the like.

Fourth Step (Thermal Treatment)

Next, the mesoporous carbon is thermally treated at a temperature higher than 1,500° C. as needed (fourth step). In a case where a carbon source is carbonized in the mesopores in the mesoporous silica, the thermal treatment temperature needs to be lowered in order to suppress a reaction between silica and carbon. Therefore, the degree of graphitization of carbon obtained by performing the carbonization treatment in the second step tends to be low. In order to obtain mesoporous carbon with a high degree of graphitization, the mesoporous carbon is preferably thermally treated at a high temperature (graphitization treatment) after removing the mesoporous silica as the template.

In a case where the thermal treatment is performed in the fourth step, the thermal treatment temperature is preferably higher than 1,500° C. from the viewpoint of sufficient graphitization. The thermal treatment temperature is preferably 1,700° C. or higher and more preferably 1,800° C. or higher. On the other hand, even when the thermal treatment temperature is set to be higher than needed, there is no difference in effect, and there is no benefit. Therefore, the thermal treatment temperature is preferably 2,300° C. or lower, and more preferably 2,200° C. or lower.

The graphitization treatment can be performed under an inert atmosphere such as an argon atmosphere. Graphitization of the mesoporous carbon proceeds by the graphitization treatment (thermal treatment), resulting in mesoporous carbon having a high degree of graphitization and improved electron conductivity, which is preferable. Method For Producing Catalyst For Fuel Cell The catalyst for a fuel cell of the present embodiment can be produced by allowing a carrier such as mesoporous carbon obtained by the method to support a catalyst metal.

A method for allowing the carrier made of mesoporous carbon to support the catalyst metal is not particularly limited, and a known method can be used. Examples of such a method include (1) a method in which a carrier is brought into contact with a solution containing ions of elements constituting catalyst metal particles to allow the ions to be adsorbed to the carrier, and the carrier to which the ions are adsorbed is held in a reducing atmosphere to reduce the ions adsorbed to the carrier into a metal and obtain catalyst metal particles, (2) a method in which a carrier is immersed in a solution containing ions of elements constituting catalyst metal particles to reduce the ions in the solution thereby allowing the carrier to directly support the catalyst metal particles, and (3) a method in which metal elements constituting catalyst metal particles are directly supported on a carrier by a physical method as they are. In addition, in a case where the catalyst metal is an alloy, examples of the method for allowing the carrier to support the catalyst metal include a method in which metals constituting an alloy are supported by a carrier and are thereafter heated to be alloyed.

The catalyst for a fuel cell of the present embodiment can be suitably used as a catalyst for a cathode (air electrode) of a fuel cell, and can form an air electrode (air electrode catalyst layer) together with an ionomer. Regarding the air electrode, for example, an electrode for a fuel cell is produced by mixing the catalyst for a fuel cell of the present embodiment with an ionomer to coat the catalyst for a fuel cell with the ionomer, and then forming a catalyst layer using the catalyst for a fuel cell coated with the ionomer.

Ionomer Coating Step

An ionomer coating step is a step of mixing the catalyst for a fuel cell and the ionomer to coat the catalyst for a fuel cell with the ionomer.

The ionomer is not particularly limited, and for example, a perfluorocarbon sulfonic acid polymer or a highly oxygen-permeable ionomer can be used. As the ionomer, any one thereof may be used, or two or more thereof may be used in combination.

As the perfluorocarbon sulfonic acid polymer, there is a fluorine-containing ion exchange resin including a repeating unit based on a fluorinated sulfonyl vinyl ether monomer. Examples of the perfluorocarbon sulfonic acid polymer include NAFION (registered trademark), FLEMION (registered trademark), AQUIVION (registered trademark), and ACIPLEX (registered trademark).

The highly oxygen-permeable ionomer refers to a polymer compound including an acid group and a cyclic structure in a molecular structure thereof. The highly oxygen-permeable ionomer includes a cyclic structure in the molecular structure thereof and thus has a high oxygen permeability coefficient. Therefore, when the highly oxygen-permeable ionomer is used as the ionomer, an oxygen transfer resistance at an interface with the catalyst becomes relatively small.

In other words, the "highly oxygen-permeable ionomer" refers to an ionomer having a higher oxygen permeability coefficient than perfluorocarbon sulfonic acid polymers represented by NAFION (registered trademark).

Examples of the highly oxygen-permeable ionomer include (a) an electrolyte polymer including a perfluorocarbon unit having an aliphatic ring structure and an acid group unit having perfluorosulfonic acid in a side chain, (b) an electrolyte polymer including a perfluorocarbon unit having an aliphatic ring structure and an acid group unit having a perfluoroimide in a side chain, (c) an electrolyte polymer including a unit in which perfluorosulfonic acid is directly bonded to perfluorocarbon having an aliphatic ring structure (for example, refer to Japanese Unexamined Patent Application Publication No. 2003-036856 (JP 2003-036856 A), WO 2012/088166, Japanese Unexamined Patent Application Publication No. 2013-216811 (JP 2013-216811 A), and Japanese Unexamined Patent Application Publication No. 2006-152249 (JP 2006-152249 A)).

An ionomer content in the catalyst layer may be appropriately set according to the amount of the carrier, and an ionomer mass/carbon (carrier) mass (I/C ratio) may be, for example, 0.3 to 1.3, preferably 0.4 to 1.1, and more preferably 0.5 to 1.0.

In this coating step, a dispersion medium may be added to coat the carrier with the ionomer. The dispersion medium is not particularly limited, and may be appropriately selected depending on the ionomer or the like used. For example, alcohols such as methanol, ethanol, propanol, and propylene glycol, N,N-dimethylformamide, N,N-diethylformamide, N,N-dimethylacetamide, N,N-diethylacetamide, a mixture thereof, or a mixture with water may be used.

A coating method is not particularly limited, and examples thereof include a homogenizer, a ball mill, a shear mixer, and a roll mill.

Step of Forming Catalyst Layer

After this coating step, a catalyst layer is formed. A method for forming the catalyst layer is not particularly limited, and examples thereof include a method in which a dispersion medium is added as needed to prepare a catalyst ink after the coating step, and the catalyst ink is applied to a substrate of carbon paper or a surface of a solid electrolyte membrane and is then dried, thereby forming a catalyst layer. A thickness of the catalyst layer for a fuel cell is not particularly limited, and may be 20 μm or less, 10 μm or less, or 3 μm or more. The amount of the catalyst metal contained in the catalyst layer is not particularly limited, and a basis weight of the catalyst metal may be 0.10 mg/cm$^2$ to 0.40 mg/cm$^2$, or may be 0.15 mg/cm$^2$ to 0.30 mg/cm$^2$.

The catalyst for a fuel cell of the present embodiment can be suitably used as a catalyst for a cathode (air electrode) of a fuel cell, particularly a solid polymer electrolyte fuel cell, and is not particularly limited as another member of the fuel cell. A fuel cell using the catalyst for a fuel cell of the present embodiment has improved performance compared to a fuel cell using a catalyst for a fuel cell in the related art. In particular, as described later in the examples, the fuel cell using the catalyst for a fuel cell of the present embodiment is preferable because an efficiency point voltage increases under hyper-humidified conditions.

Hereinafter, the present embodiment will be described below with reference to the examples, but the present disclosure is not limited by these examples.

Example 1 Production of Mesoporous Silica 1

N-hexadecyltrimethylammonium chloride [C$_{16}$H$_{33}$N(CH$_3$)$_3$Cl] as a surfactant and 1N sodium hydroxide was added to a mixed solvent containing a water, methanol, and ethylene glycol (EG) to obtain a first solution. Separately, tetraethoxysilane (TEOS) was added to a mixed solvent containing methanol and EG to obtain a second solution. The amount of each raw material used is shown in Table 1 below.

TABLE 1

|  |  | (g) |
|---|---|---|
| First solution | Water | 235 |
|  | Methanol | 57 |
|  | EG | 50 |
|  | Surfactant | 6.3 |
|  | 1N NaOH | 6.8 |
| Second solution | TEOS | 7.0 |
|  | Methanol | 13 |
|  | EG | 13 |

When the second solution was added to the first solution, the solution became white turbid after a while, and it was possible to confirm that particles could be synthesized. After stirring at room temperature for 8 hours, the solution was filtered, and the residue was re-dispersed in water. The resultant was filtered again, and the residue was dried in an oven at 45° C. to obtain a sample. The obtained sample was dispersed in 2 N sulfuric acid and then heated at 120° C. for 3 days in an autoclave. The sample after the autoclave treatment was filtered and washed, and thereafter the sample was baked at 550° C. for 6 hours to remove an organic component, thereby obtaining mesoporous silica-1. A peak diameter of mesopores of the silica obtained by the BJH method of nitrogen adsorption measurement was 5 nm to 10 nm. In addition, a peak diameter of macropores of the silica obtained by mercury intrusion porosimetry was 0.14 μm.

Production of Mesoporous Carbon 1

The mesoporous silica-1 was put into a container made of PFA (tetrafluoroethylene/perfluoroalkoxy ethylene copolymer resin), furfuryl alcohol (FA) was added in an amount corresponding to a pore volume of the mesoporous silica-1 to permeate into the pores of the silica.

The mesoporous silica-1 into which the FA had permeated was thermally treated at 150° C. for 18 hours to polymerize the FA. Furthermore, the resultant was thermally treated at 500° C. for 6 hours in a nitrogen atmosphere to carbonize the FA.

To the mesoporous silica-1/FA carbide thus obtained, FA was added in an amount corresponding to a pore volume of the mesoporous silica-1/FA carbide to permeate into the pores. The mesoporous silica-1/FA carbide into which the FA had permeated was thermally treated at 150° C. for 18 hours to polymerize the FA, and was then thermally treated at 900° C. for 6 hours in a nitrogen atmosphere to obtain a mesoporous silica/carbon complex.

This complex was immersed in a 12% HF solution for 12 hours to dissolve a silica component. After the dissolution, filtration and washing were repeated, and the resultant was further dried at 45° C. to obtain mesoporous carbon-1. The mesoporous carbon-1 was thermally treated (graphitization treatment) by being held at 1,800° C. for 1 hour in an argon stream to obtain thermally treated mesoporous carbon-1 (carrier).

Supporting Step

In 41.6 mL of pure water, 1 g of the thermally treated mesoporous carbon-1 was dispersed, and 0.72 g of a platinum-containing dinitrodiamine platinum salt aqueous solution (Japanese Patent No. 4315857(JP 4315857 B): manufactured by Cataler Corporation) was added thereto. Thereafter, 3.2 g of ethanol was further added and heated, thereby reducing platinum. Accordingly, the carrier made of the mesoporous carbon-1 was allowed to support platinum particles as catalyst metal, thereby obtaining a platinum-supported catalyst. Next, the platinum catalyst was allowed to support cobalt, thereby obtaining a platinum-cobalt-supported catalyst. Cobalt was supported in such an amount that platinum:cobalt was 7:1 (molar ratio) in a final catalyst for a fuel cell.

Alloying Step

The obtained platinum-cobalt-supported catalyst was heated at 800° C. in an argon atmosphere to alloy platinum and cobalt, thereby obtaining a powdery catalyst for a fuel cell. A density of the supported platinum of the catalyst for a fuel cell was 42 wt %.

The density of the supported platinum was calculated by platinum weight/(electrode catalyst weight)×100 (wt %). The platinum weight is a weight of platinum supported on the catalyst for a fuel cell as obtained by ICP spectroscopy.

Measurement of Surface Area and Outer Surface Area, and Calculation of Inner Surface Area and Ratio between Inner and Outer Surface Areas The catalyst for a fuel cell was observed with a TEM using JEM-ARM200F (Cs-STEM) manufactured by JEOL Ltd. at an acceleration voltage of 60 kV or less and a tilt angle of ±75° to 80° to obtain continuous tilt images.

The continuous tilt images obtained were analyzed as follows using Composer and Visualizer-evo manufactured by SYSTEM IN FRONTIER INC.

(1) Using Composer, three-dimensional reconstruction was performed based on the continuous tilt images taken with the TEM.

(2) Z-slice images were created using Visualizer-evo.

(3) The Z-slice images obtained above were input to Simpleware manufactured by JSOL.

(4) Threshold was selected, and Enable was checked and applied.

(5) Carbon portions (gray portions) were visually determined. A threshold value (40 to 70) was determined and applied so that the carbon portions were filled.

(6) A Gaussian (smoothing) value of 0.9 was performed once.

(7) Island removal (floating island removal) was performed to remove regions of 500 voxels or less to extract the carbon portions.

(8) The Measurement [X2] (surface area measurement) button was pressed to measure the surface area (inner surface area+outer surface area) of the carrier.

(9) Close (closing up cavities) was performed with Cavity fill (filling) to block holes.

(10) The Measurement [X2] (surface area measurement) button was pressed to measure the outer surface area of the carrier.

(11) The inner surface area of the carrier was calculated by subtracting a value of the outer surface area of the carrier obtained in (10) from a value of the surface area of the carrier obtained in (8).

(12) The ratio between the inner and outer surface areas of the carrier was calculated by dividing the outer surface area by the inner surface area.

Calculation of Proportion of Platinum-Cobalt Alloy Particles Supported on Outer Surface of Carrier The catalyst for a fuel cell was observed with a TEM using JEM-ARM200F (Cs-STEM) manufactured by JEOL Ltd. at an acceleration voltage of 60 kV or less and a tilt angle of ±75° to 80° to obtain continuous tilt images.

The continuous tilt images obtained were analyzed as follows using Composer and Visualizer-evo manufactured by SYSTEM IN FRONTIER INC.

(1) The outer surface and the inner surface of the carrier were defined by the method described above (Measurement of Surface Area and Outer Surface Area, and Calculation of Inner Surface Area and Ratio between Inner and Outer Surface Areas).

(2) All the platinum-cobalt alloy particles that had portions exposed from the outer surface of the carrier were counted as platinum-cobalt alloy particles supported on the outer surface of the carrier, that is, external particles.

(3) Platinum-cobalt alloy particles not exposed from the outer surface of the carrier were counted as platinum-cobalt alloy particles supported on the inner surface of the carrier, that is, internal particles.

(4) Taking the total number of external particles and internal particles as 100%, the proportion of the external particles (the proportion of the platinum-cobalt alloy particles supported on the outer surface of the carrier) (%) was calculated.

Average Particle Diameter of Platinum-Cobalt Alloy Particles

Regarding the catalyst for a fuel cell, an average particle diameter of the platinum-cobalt alloy particles was calculated from a line width of a diffraction peak of a (220) plane of the platinum-cobalt alloy particles in powder XRD according to the Scherrer equation.

Average Equivalent Circle Diameter of Carrier

An average equivalent circle diameter of the thermally treated mesoporous carbon-1 (carrier) was obtained by the following method.

In a SEM image of the thermally treated mesoporous carbon-1 obtained using a field emission scanning electron microscope (FE-SEM) (manufactured by Hitachi High-Tech Corporation), a diameter (area equivalent circle diameter) of a certain particle when the particle was regarded as a circle was calculated, and area equivalent circle diameters of a total of 100 particles were calculated in the same manner. The number average of the area equivalent circle diameters of the 100 particles was calculated as the average equivalent circle diameter of the carrier.

Production of Catalyst Ink

To 1 g of a powder of the catalyst for a fuel cell, 8 g of ultrapure water and 6 g of ethanol were added and were stirred, and thereafter 0.52 g of an ionomer was added thereto. Next, the resultant was dispersed for 30 minutes with an ultrasonic disperser, and was thereafter dispersed at 30 m/s for 15 minutes using a thin-film spin system mixer (Filmix) manufactured by Primix, thereby obtaining a catalyst ink as a uniform slurry. Production of Air Electrode Catalyst Layer Sheet The catalyst ink was applied onto a polytetrafluoroethylene sheet using an ink coater, and was dried for 5 minutes in an air dryer at 80° C. after the application, thereby obtaining an air electrode catalyst layer sheet in which an air electrode catalyst layer was formed on the polytetrafluoroethylene sheet.

The air electrode catalyst layer had a platinum basis weight of 0.2 mg/cm$^2$ and an ionomer mass/carbon (carrier) mass (I/C ratio) of 0.95.

Production of Fuel Electrode Catalyst Layer Sheet

To 1 g of a powder of the platinum-supported carbon black (ketjen), 8 g of ultrapure water and 6 g of ethanol were added and were stirred, and thereafter 0.26 g of an ionomer (Nafion) was added thereto. Next, the resultant was dispersed for 30 minutes with an ultrasonic disperser, and was thereafter dispersed at 30 m/s for 15 minutes using a thin-film spin system mixer (Filmix) manufactured by Primix, thereby obtaining a catalyst ink as a uniform slurry.

The catalyst ink was applied onto a polytetrafluoroethylene sheet using an ink coater, and was dried for 5 minutes in an air dryer at 80° C. after the application, thereby obtaining a fuel electrode catalyst layer sheet in which a fuel electrode catalyst layer was formed on the polytetrafluoroethylene sheet.

The fuel electrode catalyst layer had a platinum basis weight of 0.2 mg/cm$^2$ and an ionomer mass/carbon black (carrier) mass (I/C ratio) of 0.5.

Production of Fuel Cell

A Teflon (registered trademark) sheet, which was an electrolyte membrane, was sandwiched between the air electrode catalyst layer sheet and the fuel electrode catalyst layer sheet, and was heated and pressed to transfer the catalyst layers (the air electrode catalyst layer and the fuel electrode catalyst layer) to Teflon. Then, the polytetrafluoroethylene sheet was peeled off, thereby obtaining a membrane electrode assembly (MEA).

The MEA was assembled into a 1 cm$^2$ square cell. Next, diffusion layers and current collectors were arranged on both sides of the MEA to obtain a fuel cell. Carbon paper (with a microporous layer) was used as the diffusion layer. A flow path-integrated gold-plated copper plate (flow paths: linear flow paths at pitches of 0.4 mm) was used as the current collector.

Evaluation of Performance of Fuel Cell

The fuel cell was heated so that a cell temperature reached 60° C., and a voltage value (mV) at 0.2 A/cm$^2$ (efficiency point voltage) was evaluated under a hyper-humidified condition of 80% RH.

As power generation conditions, a H$^2$ flow rate was set to 500 cc/min, an air flow rate was set to 1,000 cc/min, and a back pressure was set to 1 kg/cm$^2$.

As a measuring device, As-510-340 fuel cell power generation characteristic evaluation system manufactured by NF corporation was used.

Example 2

Production was performed in the same manner as in Example 1, except that the thermally treated mesoporous carbon-1 was changed to thermally treated mesoporous carbon-2 produced by the following method.

Production of Mesoporous Silica-2

To 700 g of 1.5 wt % hydrochloric acid, 20 g of N-hexadecyltrimethylammonium chloride [C$_{16}$H$_{33}$N(CH$_3$)$_3$Cl] as a surfactant and 14 g of ethanol were added to obtain a hydrochloric acid solution. While heating and stirring this hydrochloric acid solution at 70° C., 65 g of No. 1 sodium silicate (33 wt % as SiO$_2$, SiO$_2$/Na$_2$O=2.00) was added thereto and was held for 3 hours, whereby a condensation polymerization reaction occurred.

A solid product obtained was separated by filtration, was then dispersed in 1,000 g of ion-exchanged water, and was stirred. The filtration, dispersion, and stirring were repeated 5 times to wash the solid product, and then the washed solid product was dried at 70° C. for 24 hours.

Next, the dried solid product was dispersed in 2 N hydrochloric acid and was heated in a closed container at 80° C. for 3 days. The solid product after the heating treatment was filtered, washed, dried, and then baked at 550° C. for 6 hours in the presence of air, thereby obtaining mesoporous silica-2. A peak diameter of mesopores of the silica obtained by the BJH method of nitrogen adsorption measurement was 6.9 nm. In addition, a peak diameter of macropores of the silica obtained by mercury intrusion porosimetry was 0.25 μm.

Production of Mesoporous Carbon-2

Thermally treated mesoporous carbon-2 (carrier) was obtained in the same manner as in Example 1, except that the mesoporous silica-1 was changed to the mesoporous silica-2.

Example 3

Production was performed in the same manner as in Example 1, except that the thermally treated mesoporous carbon-1 was changed to thermally treated mesoporous carbon-3 produced by the following method.

Production of Mesoporous Silica-3

To 550 g of 2 wt % hydrochloric acid, 20 g of N-hexadecyltrimethylammonium chloride [C$_{16}$H$_{33}$N(CH$_3$)$_3$Cl] as a surfactant and 14 g of ethanol were added to obtain a hydrochloric acid solution. While heating and stirring this hydrochloric acid solution at 70° C., 65 g of No. 1 sodium silicate (33 wt % as SiO$_2$, SiO$_2$/Na$_2$O=2.00) was added thereto and was held for 3 hours, whereby a condensation polymerization reaction occurred.

A solid product obtained was separated by filtration, was then dispersed in 1,000 g of ion-exchanged water, and was stirred. The filtration, dispersion, and stirring were repeated 5 times to wash the solid product, and then the washed solid product was dried at 70° C. for 24 hours.

Next, the dried solid product was dispersed in 2 N hydrochloric acid and was heated in a closed container at 80° C. for 3 days. The solid product after the heating treatment was filtered, washed, dried, and then baked at 550° C. for 6 hours in the presence of air, thereby obtaining mesoporous silica-3. A peak diameter of mesopores of the silica obtained by the BJH method of nitrogen adsorption measurement was 8.1 nm. In addition, a peak diameter of macropores of the silica obtained by mercury intrusion porosimetry was 0.27 μm.

Production of Mesoporous Carbon-3

Thermally treated mesoporous carbon-3 (carrier) was obtained in the same manner as in Example 1, except that the mesoporous silica-1 was changed to the mesoporous silica-3.

Example 4

Production was performed in the same manner as in Example 1, except that the thermally treated mesoporous carbon-1 was changed to thermally treated mesoporous carbon-4 produced by the following method.

Production of Mesoporous Silica-4

To 550 g of 1.5 wt % hydrochloric acid, 18 g of N-hexa-decyltrimethylammonium chloride [$C_{16}H_{33}N(CH_3)_3Cl$] as a surfactant and 13 g of ethanol were added to obtain a hydrochloric acid solution. While heating and stirring this hydrochloric acid solution at 40° C., 65 g of No. 1 sodium silicate (33 wt % as $SiO_2$, $SiO_2/Na_2O=2.00$) was added thereto and was held for 3 hours, whereby a condensation polymerization reaction occurred.

A solid product obtained was separated by filtration, was then dispersed in 1,000 g of ion-exchanged water, and was stirred. The filtration, dispersion, and stirring were repeated 5 times to wash the solid product, and then the washed solid product was dried at 70° C. for 24 hours.

Next, the dried solid product was dispersed in 2 N hydrochloric acid and was heated in a closed container at 80° C. for 3 days. The solid product after the heating treatment was filtered, washed, dried, and then baked at 550° C. for 6 hours in the presence of air, thereby obtaining mesoporous silica-4. A peak diameter of mesopores of the silica obtained by the BJH method of nitrogen adsorption measurement was 7.8 nm. In addition, a peak diameter of macropores of the silica obtained by mercury intrusion porosimetry was 0.26 μm.

Production of Mesoporous Carbon-4

Thermally treated mesoporous carbon-4 (carrier) was obtained in the same manner as in Example 1, except that the mesoporous silica-1 was changed to the mesoporous silica-4.

Example 5

Production was performed in the same manner as in Example 1, except that the thermally treated mesoporous carbon-1 was changed to thermally treated mesoporous carbon-5 produced by the following method.

Production of Mesoporous Carbon 5

Thermally treated mesoporous carbon-5 (carrier) was obtained in the same manner as in Example 1, except that the mesoporous silica-1 was changed to the mesoporous silica-4 described in Example 4 and the thermal treatment (graphi-tization treatment) of performing holding at 1,800° C. for 1 hour was changed to a thermal treatment (graphitization treatment) of performing holding at 2,200° C. for 1 hour. A peak diameter of mesopores of the silica obtained by the BJH method of nitrogen adsorption measurement was 9.2 nm. In addition, a peak diameter of macropores of the silica obtained by mercury intrusion porosimetry was 0.28 μm.

Comparative Example 1

Production was performed in the same manner as in Example 1, except that the thermally treated mesoporous carbon-1 was changed to a commercially available mes-oporous carbon subjected to a thermal treatment (graphiti-zation treatment) of performing holding at 1,980° C. for 1 hour.

Comparative Example 2

Production was performed in the same manner as in Example 1, except that the thermally treated mesoporous carbon-1 was changed to commercially available carbon black.

Comparative Example 3

Production was performed in the same manner as in Example 1, except that the thermally treated mesoporous carbon-1 was changed to commercially available mes-oporous carbon different from that of Comparative Example 1.

Comparative Example 4

Production was performed in the same manner as in Example 1, except that the thermally treated mesoporous carbon-1 was changed to thermally treated mesoporous carbon-c4 produced by the following method.

Production of Mesoporous Silica-c4

To 600 g of 1.5 wt % hydrochloric acid, 18 g of N-hexa-decyltrimethylammonium chloride [$C_{16}H_{33}N(CH_3)_3Cl$] as a surfactant and 12 g of ethanol were added to obtain a hydrochloric acid solution. While heating and stirring this hydrochloric acid solution at 70° C., 60 g of No. 1 sodium silicate (30 wt % as $SiO_2$, $SiO_2/Na_2O=2.00$) was added thereto and was held for 3 hours, whereby a condensation polymerization reaction occurred.

A solid product obtained was separated by filtration, was then dispersed in 1,000 g of ion-exchanged water, and was stirred. The filtration, dispersion, and stirring were repeated 5 times to wash the solid product, and then the washed solid product was dried at 70° C. for 24 hours.

Next, the dried solid product was dispersed in 2 N hydrochloric acid and was heated in a closed container at 130° C. for 3 days. The solid product after the heating treatment was filtered, washed, dried, and then baked at 550° C. for 6 hours in the presence of air, thereby obtaining mesoporous silica-c4.

Production of Mesoporous Carbon-c4

Thermally treated mesoporous carbon-c4 (carrier) was obtained in the same manner as in Example 1, except that the mesoporous silica-1 was changed to the mesoporous silica-c4.

Comparative Example 5

Production was performed in the same manner as in Example 1, except that the thermally treated mesoporous carbon-1 was changed to the mesoporous carbon of Com-parative Example 1 subjected to a thermal treatment (graphi-tization treatment) of performing holding at 2,100° C. for 1 hour.

Comparative Example 6

Production was performed in the same manner as in Example 1, except that the thermally treated mesoporous carbon-1 was changed to the mesoporous carbon of Com-parative Example 1 subjected to a thermal treatment (graphi-tization treatment) of performing holding at 1,400° C. for 1 hour.

In the catalysts for a fuel cell (catalysts used to form the air electrode catalyst layers) of the examples and compara-tive examples, results of the surface areas, outer surface areas, inner surface areas, and the ratios between the inner and outer surface areas of the carriers, the proportions of the platinum-cobalt alloy particles supported on the outer sur-faces of the carriers, and evaluation of the performance of the fuel cells are shown in Tables 2 and 3. In Tables 2 and 3 below, the platinum-cobalt alloy particles are referred to as platinum alloy particles.

TABLE 2

|  | Example 1 | Example 2 | Example 3 | Example 4 | Example 5 |
|---|---|---|---|---|---|
| surface area ($\mu m^2$/particle) | 0.178 | 0.204 | 0.259 | 0.196 | 0.289 |
| outer surface area ($\mu m^2$/particle) | 0.064 | 0.079 | 0.105 | 0.074 | 0.113 |
| inner surface area ($\mu m^2$/particle) | 0.113 | 0.126 | 0.154 | 0.122 | 0.176 |
| Ratio between inner and outer surface areas | 0.57 | 0.63 | 0.68 | 0.60 | 0.64 |
| Proportion of metal alloy particles supported on outer surface (%) | 23 | 26 | 32 | 25 | 35 |
| Average particle diameter of platinum alloy particles (nm) | 3.2 | 3.4 | 2.9 | 3.1 | 3.2 |
| Average equivalent circle diameter of carrier (nm) | 111.1 | 237.9 | 154.1 | 151.3 | 168.7 |
| Efficiency point voltage (80% RH) relative value*[1] | 1.02 | 1.02 | 1.01 | 1.01 | 1.01 |

*[1]Relative value when the efficiency point voltage (mV) of Comparative Example 1 is set to 1.00

TABLE 3

|  | Comparative Example 1 | Comparative Example 2 | Comparative Example 3 | Comparative Example 4 | Comparative Example 5 | Comparative Example 6 |
|---|---|---|---|---|---|---|
| surface area ($\mu m^2$/particle) | 0.221 | 1.000 | 0.487 | 0.170 | 0.246 | 0.251 |
| outer surface area ($\mu m^2$/particle) | 0.092 | 1.000 | 0.204 | 0.071 | 0.075 | 0.074 |
| inner surface area ($\mu m^2$/particle) | 0.129 | 0 | 0.283 | 0.099 | 0.171 | 0.177 |
| Ratio between inner and outer surface areas | 0.71 | — | 0.72 | 0.72 | 0.44 | 0.42 |
| Proportion of metal alloy particles supported on outer surface (%) | 35 | 53 | 27 | 37 | 16.5 | 16 |
| Average particle diameter of platinum alloy particles (nm) | 3.3 | 3.6 | 3.4 | 3.1 | 3.1 | 3.2 |
| Average equivalent circle diameter of carrier (nm) | 150.9 | 36.7 | 810.2 | 160.3 | 137.2 | 170.5 |
| Efficiency point voltage (80% RH) relative value*[1] | 1.00 | 0.99 | 0.98 | 1.00 | 0.99 | 1.00 |

*[1]Relative value when the efficiency point voltage (mV) of Comparative Example 1 is set to 1.00

The fuel cell using the catalyst for a fuel cell of the examples had a higher efficiency point voltage and better performance as a catalyst for a fuel cell than the fuel cell using the catalyst for a fuel cell of the comparative examples.

Upper and/or lower limits of numerical ranges described herein can be combined arbitrarily to define a preferred range. For example, a preferred range can be defined by arbitrarily combining the upper and lower limits of the numerical ranges, a preferred range can be defined by arbitrarily combining the upper limits of the numerical ranges, and a preferred range can be defined by arbitrarily combining the lower limits of the numerical ranges.

While the present embodiment has been described above in detail, specific configurations are not limited to the embodiment, and even if there are design changes within the scope without departing from the gist of the present disclosure, the design changes are included in the present disclosure.

What is claimed is:

1. A catalyst for a fuel cell, the catalyst comprising:
a catalyst metal; and
a carrier that supports the catalyst metal, wherein:
an outer surface area of the carrier to an inner surface area of the carrier, which is a ratio between the inner and outer surface areas of the carrier, is 0.56 to 0.69; and
a proportion of the catalyst metal supported on an outer surface of the carrier is 23% to 35%.

2. The catalyst according to claim 1, wherein the carrier is mesoporous carbon.

3. The catalyst according to claim 1, wherein the catalyst metal is platinum or a platinum alloy.

4. The catalyst according to claim 2, wherein the mesoporous carbon includes carbon particles having a pore volume of 80% or more in a pore diameter distribution of 2 nm to 10 nm with respect to a total pore volume in a pore diameter distribution of 1 nm to 100 nm.

5. The catalyst according to claim 2, wherein an average primary particle diameter of the mesoporous carbon is 70 nm or more and 250 nm or less.

\* \* \* \* \*